Patented July 24, 1928.

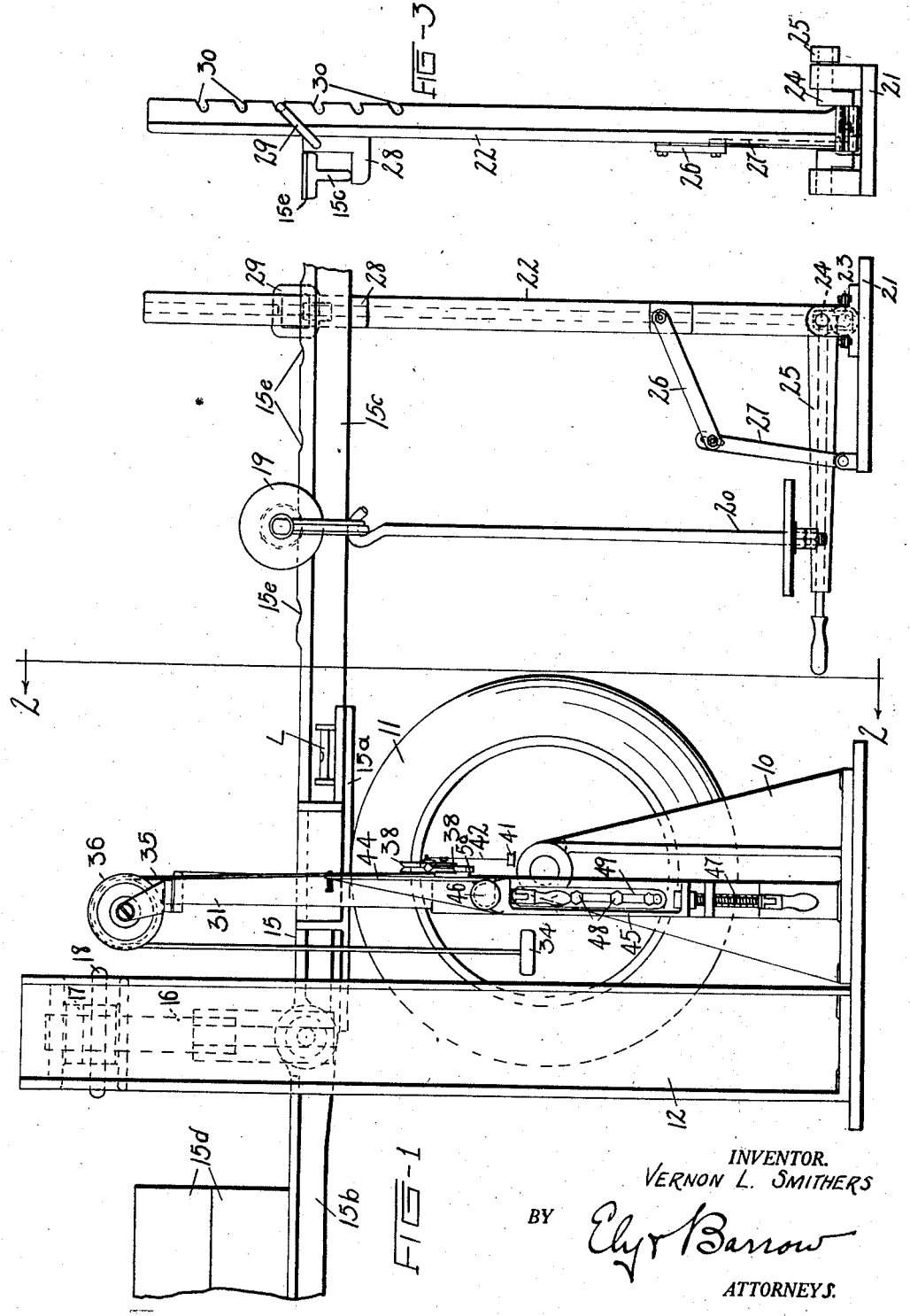

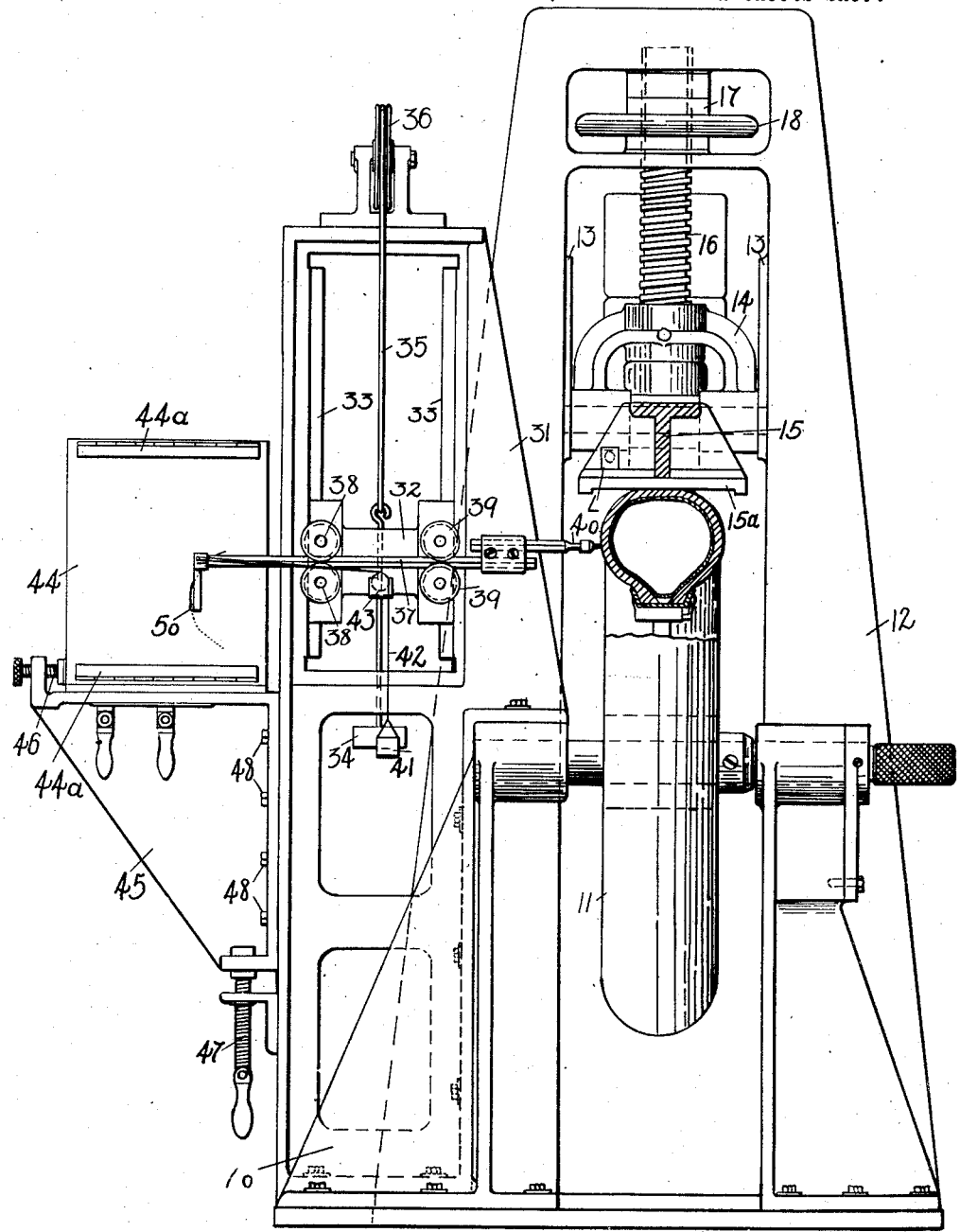

1,678,363

UNITED STATES PATENT OFFICE.

VERNON L. SMITHERS, OF CUYAHOGA FALLS, OHIO.

MACHINE FOR INVESTIGATING THE PROPERTIES OF TIRES UNDER LOADS.

Application filed March 22, 1927. Serial No. 177,316.

This invention relates to devices for use in investigating the condition or properties of rubber vehicle tires, and particularly pneumatic tire constructions, under determinate loads.

One purpose of the invention is to provide means for effectively reproducing on a chart the profiles of tires under determinate loads.

A further purpose of the invention is to provide means for effectively reproducing on a chart the tread contact area of tires under determinate loads.

The foregoing and other objects are obtained by the construction illustrated in the accompanying drawings and described below. It is to be understood that the invention is not limited to the specific form thereof shown and described.

Of the accompanying drawings,

Figure 1 is a side elevation of a device embodying the invention;

Figure 2 is a section on line 2—2 of Figure 1; and

Figure 3 is a detail end elevation of the means for lifting or lowering the load-applying end of the load-applying lever.

Referring to the drawings, the numeral 10 designates a bracket for removably mounting a tire 11 thereon in any suitable way. To one side of bracket 10 is a standard 12 formed with vertical guides 13 on which is slidable a pivoting yoke or fulcrum member 14 for a lever 15, the fulcrum member 14 being vertically adjustable by means of a screw 16 swiveled thereto and threaded through a nut 17 operable by a hand wheel 18.

The lever 15 has secured on its under surface over tire 11 a flat-surfaced pressure member 15ª operable against the periphery of tire 11. This lever has a short arm 15ᵇ and a long arm 15ᶜ, the latter being balanced by the short arm 15ᵇ as by adding weights thereto at 15ᵈ. The long arm has a series of depressions 15ᵉ, 15ᵉ in its upper edge for receiving a peripherally grooved roller 19 riding thereon for supporting a weight hanger 20 at determinate distances on lever arm 15ᶜ to obtain determinate loads on the tire 11.

A device for lifting the lever 15 from or lowering it onto the tire 11 is mounted on a base plate 21, this device comprising an upwardly extended member 22 pivoted on a crank pin 23 and operable vertically in either direction by a crank 24 secured to an operating lever 25, the member 22 being supported in upright position by linkage 26, 27 between it and base plate 21. The member 22 has adjustably mounted thereon a hook member 28 supported on a link 29 removably engaged in any one of a series of notches 30 in an edge of member 22, the member 28 being adapted to engage under arm 15ᶜ of lever 15 to lift it or to support it while it is lowered.

Arranged in front of the tire 11 there is a standard 31 which may be integral with bracket 10 and which supports a tire profile reproducing device. This device includes a cross-head 32 vertically slidable on guides 33, 33 on standard 31 and balanced in any suitable way as by a weight 34 attached to a cable 35 extending over a sheave 36 and connected to the cross-head 32.

Reciprocably mounted on cross-head 32 for lateral movement is a follower member 37 supported between freely journaled series of rollers 38, 38 and 39, 39 and carrying a stylus 40 for contacting with the surface of the tire 11 against which it is yieldingly urged by suitable means such as weight 41 connected by a cable 42, extended over a pulley 43, to the outer end of follower member 37.

To chart the profiles of tire 11 under various loads a chart supporting frame 44, having chart clamping means 44ª, 44ª thereon, is mounted on a bracket 45 on which it is adjustable forwardly and rearwardly in its own plane by a screw 46, bracket 45 being vertically adjustable by a screw 47, the bracket 45 being shiftably mounted on standard 31 by bolts 48 engaged through slot 49 in said bracket. The outer end of follower member 37 carries a pen 50 or other suitable marker for reproducing the profile of the tire 11 on the chart.

In use, tread contact impressions and tire profile reproductions may be taken either independently or both taken while the tire is under one determinate load. In investigating the properties of pneumatic tires under load, these are, of course, inflated to determinate internal pressures. To take tread contact impressions, multigraph ribbon is capable of effective use, a sheet of paper being arranged on the under surface of pressure member 15ª, and the ribbon being arranged between the surface of the tire and the paper, the lever 15 with the proper load thereon being lowered in exact horizontal alignment onto the tire by simultaneous operation of fulcrum adjusting screw 18 and lever 25 while the operative watches a spirit level L mounted on the lever 15. The ink is squeezed from the ribbon onto the paper giving a clear, well-defined impression.

The profile of the tire is charted by moving cross-head 32 vertically to cause stylus 40 to follow the side of the tire from tread to rim, the pen 50 reproducing the profile of the tire on a chart mounted on the support 44.

It will appear from the foregoing that a simple but effective apparatus has been provided for obtaining tread contact impressions and tire profiles under various loads. It will also be apparent that modifications of the invention may be resorted to without departing from the spirit thereof or the scope of the appended claims.

What is claimed is:

1. A device of the class described comprising means for supporting a pneumatic tire, means for applying determinate loads onto the periphery of the tire, means for taking tread contact impressions of the tire under the determinate loads, and means for reproducing profiles of the sidewall of the tire on a chart when deflected under said determinate loads.

2. A device of the class described comprising means for supporting a pneumatic tire, means for applying determinate loads onto the periphery of the tire, and means for reproducing profiles of the sidewall of the tire on a chart when deflected under said determinate loads.

3. A device of the class described comprising means for supporting a tire, means for applying determinate loads onto the periphery of the tire, said means including a balanced lever, an adjustable fulcrum for the lever and means for applying determinate loads on the lever, means for taking tread contact impressions of the tire under the determinate loads, said means including a flat-surfaced pressure member on said lever for receiving a sheet on which the impression may be made, a level on the lever and means for lowering the lever onto the tire while maintaining the lever horizontal, and means for reproducing profiles of the tire on a chart when under said determinate loads, said means comprising a vertically movable member, a laterally movable follower on said vertically movable member, a stylus on said follower, means yieldingly urging the stylus against the tire, a marker carried by the follower and means for supporting a chart in position for operation of said marker thereon.

4. A device of the class described comprising means for supporting a tire, means for applying determinate loads onto the periphery of the tire, said means including a balanced lever, an adjustable fulcrum for the lever and means for applying determinate loads on the lever, and means for taking tread contact impressions of the tire under the determinate loads, said means including a flat-surfaced pressure member on said lever for receiving a sheet on which the impression may be made, a level on the lever and means for lowering the lever onto the tire while maintaining the lever horizontal.

5. A device of the class described comprising means for supporting a tire, means for applying determinate loads onto the periphery of the tire, said means including a balanced lever, an adjustable fulcrum for the lever and means for applying determinate loads on the lever, and means for reproducing profiles of the tire on a chart when under said determinate loads, said means comprising a vertically movable member, a laterally movable follower on said vertically movable member, a stylus on said follower, means yieldingly urging the stylus against the tire, a marker carried by the follower and means for supporting a chart in position for operation of said marker thereon.

6. A device of the class described comprising means for supporting a tire, means for applying determinate loads onto the periphery of the tire, said means including a balanced lever, an adjustable fulcrum for the lever and means for applying determinate loads on the lever, means for taking tread contact impressions of the tire under the determinate loads, said means including a flat-surfaced pressure member on said lever for receiving a sheet on which the impression may be made and means for lowering the lever onto the tire while maintaining the lever horizontal, and means for reproducing profiles of the tire on a chart when under said determinate loads, said means comprising a vertically movable member, a laterally movable member, a stylus on said follower, means yieldingly urging the stylus against the tire, a marker carried by the follower and means for supporting a chart in position for operation of said marker thereon.

7. A device of the class described comprising means for supporting a tire, means for applying determinate loads onto the periphery of the tire, said means including a balanced lever, an adjustable fulcrum for the lever and means for applying determinate loads on the lever, and means for taking tread contact impressions of the tire under the determinate loads, said means including a flat-surfaced pressure member on said lever for receiving a sheet on which the impression may be made and means for lowering the lever onto the tire while maintaining the lever horizontal.

8. A device of the class described comprising means for supporting a tire, means for applying determinate loads onto the periphery of the tire, said means including a balanced lever, an adjustable fulcrum for the lever and means for applying determinate loads on the lever, means for taking tread contact impressions of the tire under the determinate loads, said means including a flat-surfaced pressure member on said lever for receiving a sheet on which the impression may be made and means for lowering the lever onto the tire while maintaining the lever horizontal, and means for reproducing profiles of the tire on a chart when under said determinate loads, said means including a follower movable relatively across the tire and also axially thereof, means yieldingly urging the follower against the tire and means for recording the movement of the follower.

9. A device of the class described comprising means for supporting a tire, means for applying determinate loads onto the periphery of the tire, said means including a lever, means for applying determinate loads on the lever, and means for reproducing profiles of the tire on a chart when under said determinate loads, said means including a follower movable relatively across the tire and also axially thereof, means yieldingly urging the follower against the tire and means for recording the movement of the follower.

10. A device of the class described comprising means for supporting a pneumatic tire, means for applying a load upon the tire and deflecting the same, a chart adjacent the tire, a follower movable from the outer to the inner periphery of the tire, means to maintain the follower in contact with the sidewall of the tire during its movement, and means controlled by the movement thereof to reproduce the profile of the sidewall upon the chart.

VERNON L. SMITHERS.